United States Patent
Ryoke et al.

(10) Patent No.: US 6,443,827 B1
(45) Date of Patent: Sep. 3, 2002

(54) POLISHING MEMBER AND PROCESS FOR PRODUCING THE SAME

(75) Inventors: Katsumi Ryoke; Tadashi Ishiguro, both of Odawara (JP)

(73) Assignee: Fuji Photo Film Co., Ltd., Kanagawa-Ken (JP)

( * ) Notice: Subject to any disclaimer, the term of this patent is extended or adjusted under 35 U.S.C. 154(b) by 0 days.

(21) Appl. No.: 09/593,503

(22) Filed: Jun. 14, 2000

(30) Foreign Application Priority Data

Jun. 15, 1999 (JP) .......................................... 11-168193

(51) Int. Cl.$^7$ .............................. B24D 3/02; B24D 11/00
(52) U.S. Cl. ......................... 451/533; 451/539; 51/308
(58) Field of Search ........................... 451/41, 42, 526, 451/533, 534, 539; 51/293, 294, 297, 300, 307, 308, 309

(56) References Cited

U.S. PATENT DOCUMENTS

| | | | |
|---|---|---|---|
| 5,601,474 A | * | 2/1997 | Takahashi .................... 451/550 |
| 5,667,426 A | * | 9/1997 | Minami et al. ................ 451/41 |
| 5,727,989 A | * | 3/1998 | Ohno et al. .................. 451/163 |
| 5,738,576 A | * | 4/1998 | Chino et al. .................. 451/539 |
| 5,847,905 A | * | 12/1998 | Inaba et al. .................. 360/128 |
| 6,012,969 A | * | 1/2000 | Ryoke et al. ................. 451/41 |
| 6,113,469 A | * | 9/2000 | Yoshikawa et al. ........... 451/41 |
| 6,165,061 A | * | 12/2000 | Fujii et al. ................... 451/533 |

FOREIGN PATENT DOCUMENTS

| | | | |
|---|---|---|---|
| EP | 0737549 | 10/1996 | ............ B24D/3/00 |
| JP | 63-139654 A | * 6/1988 | |
| JP | 9-248771 | 9/1997 | ........... B24D/11/00 |
| JP | 10-71572 | 3/1998 | ........... B24D/11/00 |

OTHER PUBLICATIONS

Patent Abstract of Japan 09–248771 Sep. 22, 1997.
Patent Abstract of Japan 10–071572 Mar. 17, 1998.

* cited by examiner

Primary Examiner—M. Rachuba
(74) Attorney, Agent, or Firm—Sughrue Mion, PLLC

(57) ABSTRACT

A polishing member for use in polishing of an end face of an optical fiber connector ferrule comprises a substrate and a polishing layer, which is overlaid on the substrate and which comprises a binder and fine polishing particles dispersed in the binder. Agglomerated fine silica particles having a mean particle size falling within the range of 0.1 $\mu$m to 4 $\mu$m are utilized as the fine polishing particles contained in the polishing layer, and a thickness of the substrate falls within the range of 25 $\mu$m to 150 $\mu$m. The polishing with the polishing member is performed while a polishing liquid, which is constituted of water or a silica slurry, is being supplied onto a surface of the polishing layer. The polishing liquid is free from a base or an acid. The polishing layer has a dry thickness falling within the range of 5 $\mu$m to 15 $\mu$m.

4 Claims, 1 Drawing Sheet

POLISHING MEMBER AND PROCESS FOR PRODUCING THE SAME

BACKGROUND OF THE INVENTION

1. Field of the Invention

This invention relates to a polishing member, such as a polishing sheet or a polishing disk, for polishing an end face of an optical fiber connector ferrule, and a process for producing the polishing member.

2. Description of the Prior Art

End faces of optical connector ferrules in which, for example, optical fibers have been inserted and secured have heretofore been polished by utilizing polishing members or polishing slurries. In such cases, since different materials are polished at the end face of the optical fiber connector ferrule, satisfactory polishing results cannot always be obtained in the aspect of optical transfer loss at the end face, or the like.

Specifically, the end face of the optical fiber connector ferrule contains different materials including various kinds of ceramics, such as a glass material, alumina, and zirconia. In order for the optical transfer loss to be prevented, the different materials must be polished uniformly. Particularly, heretofore, it has not always been possible to perform the polishing such that the surface smoothness of the ferrule surface and the optical fiber surface may be kept high, such that a difference in level between the ferrule surface and the optical fiber surface may not occur, and such that the high return loss characteristics may thereby be obtained.

An example of a polishing member has been proposed in, for example, Japanese Unexamined Patent Publication No. 8(1996)-336758. The proposed polishing member comprises a substrate and a polishing layer overlaid on the substrate by applying a coating composition, which comprises a binder and colloidal silica particles dispersed in the binder, the colloidal silica particles having a mean particle size falling within the range of 0.1 $\mu$m to 0.1 $\mu$m.

The polishing member as described above is produced with a coating composition dispersing apparatus, a coating apparatus, a calendering apparatus which may be employed when necessary, a heat treatment apparatus, a slitting apparatus, a wind-up apparatus, and the like.

With the conventional polishing member described above, the colloidal silica particles having a mean particle size falling within the range of 0.01 $\mu$m to 0.1 $\mu$m are dispersed in the polishing layer. Non-colloidal silica particles (un-agglomerated silica particles) having the fine particle size described above have the problems in that they cannot be easily dispersed in the binder and a solvent and, therefore, the coating composition for forming the polishing layer cannot be prepared. Therefore, in the conventional polishing member described above, the colloidal silica particles are utilized. However, the use of the colloidal silica particles is disadvantageous from the view points of the productivity, the cost, and the like.

In cases where fine polishing particles of alumina, or the like, other than silica are utilized, if they have a high Mohs hardness, there is the risk that scratches will occur on the end face of the optical fiber, and a difference in level will occur between the end face of the optical fiber and the end face of the ferrule. In cases where fine polishing particles of alumina, or the like, other than silica, which have a low Mohs hardness are utilized, there is the risk that a high polishing power cannot be obtained, the surface cannot be polished smoothly, and the return loss will become large. In cases where polishing particles having a small mean particle size are utilized, the problems occur in that a high polishing power cannot be obtained, and a long time will be required to perform the polishing. In cases where polishing particles having a large mean particle size are utilized, the problems occur in that flaws (scratches) occur on the polished surface, the surface will become rough and will have a low flatness, and finish polishing with good quality cannot be achieved.

As for techniques for polishing with a polishing slurry, an alkaline polishing slurry has heretofore been utilized. The technique for utilizing the alkaline polishing slurry is effective for lowering the viscosity, but has the problems in that neutralization, and the like, must be performed at the time of waste liquid treatment.

SUMMARY OF THE INVENTION

The primary object of the present invention is to provide a polishing member, in which dispersibility of fine silica particles is enhanced and which is suitable for polishing an end face of an optical fiber connector ferrule.

Another object of the present invention is to provide a process for producing the polishing member.

The present invention provides a polishing member for use in polishing of an end face of an optical fiber connector ferrule, the polishing member comprising a substrate and a polishing layer, which is overlaid on the substrate and which comprises a binder and fine polishing particles dispersed in the binder, wherein agglomerated fine silica particles having a mean particle size falling within the range of 0.1 $\mu$m to 4 $\mu$m are utilized as the fine polishing particles contained in the polishing layer, and a thickness of the substrate falls within the range of 25 $\mu$m to 150 $\mu$m.

In the polishing member in accordance with the present invention, the agglomerated fine silica particles, in which fine silica particles have been agglomerated, are utilized directly as the fine polishing particles contained in the polishing layer. The agglomerated fine silica particles have a mean particle size falling within the range of 0.1 $\mu$m to 4 $\mu$m. The agglomerated fine silica particles should preferably have a mean particle size falling within the range of 0.5 $\mu$m to 4 $\mu$m, and should more preferably have a mean particle size falling within the range of 0.9 $\mu$m to 4 $\mu$m. Colloidal silica particles are not utilized as the fine polishing particles contained in the polishing layer.

From the view points of lubrication effects and cooling effects, the polishing with the polishing member in accordance with the present invention should preferably be performed while a polishing liquid, which is constituted of water or a silica slurry, is being supplied onto a surface of the polishing layer. In such cases, the polishing liquid should preferably be free from a base or an acid. In cases where the polishing liquid is constituted of the silica slurry, the silica material contained in the silica slurry should preferably be identical with the silica material of the agglomerated fine silica particles, which are contained in the polishing layer.

In the polishing member in accordance with the present invention, a dry thickness of the polishing layer should preferably fall within the range of 5 $\mu$m to 15 $\mu$m. Also, in the polishing layer, the proportion of the binder per 100 parts by weight of the agglomerated fine silica particles should preferably fall within the range of 30 to 100 parts by weight.

The present invention also provides a process for producing a polishing member for use in polishing of an end face of an optical fiber connector ferrule, the process comprising the steps of:

i) preparing a coating composition for forming a polishing layer, the coating composition comprising agglomerated fine silica particles having a mean particle size falling within the range of 0.1 μm to 4 μm, a binder, and an organic solvent, ii) applying the coating composition onto a substrate having a thickness falling within the range of 25 μm to 150 μm, and iii) drying the applied coating composition to form the polishing layer.

In the process for producing a polishing member in accordance with the present invention, the agglomerated fine silica particles, in which fine silica particles have been agglomerated, are utilized directly as the fine polishing particles contained in the polishing layer. The agglomerated fine silica particles have a mean particle size falling within the range of 0.1μm to 4 μm. The agglomerated fine silica particles should preferably have a mean particle size falling within the range of 0.5 μm to 4 μm, and should more preferably have a mean particle size falling within the range of 0.9 μm to 4 μm.

Also, in the process for producing a polishing member in accordance with the present invention, the preparation of the coating composition for forming the polishing layer should preferably be performed by dispersing the agglomerated fine silica particles with a sand grinder.

Further, in the process for producing a polishing member in accordance with the present invention, a surface of the polishing layer should preferably be subjected to calendering. In such cases, the linear pressure in the calendering should preferably fall within the range of 50 kg/cm to 300 kg/cm. Also, a calendering roll may be selected from metal rolls, resin rolls, and the like.

With the polishing member in accordance with the present invention, the agglomerated fine silica particles having a mean particle size falling within the range of 0.1 μm to 4 μm are utilized as the fine polishing particles contained in the polishing layer, which is overlaid on the substrate having a thickness falling within the range of 25 μm to 150 μm. When the agglomerated fine silica particles are dispersed in the binder, they are not dispersed to the level of the primary particles. The agglomerated fine silica particles are uniformly dispersed with the sizes of the agglomerated fine silica particles in the binder. The polishing layer, in which the agglomerated fine silica particles are dispersed with the agglomerated particle sizes, has a high film strength and enhanced polishing performance for the polishing of the end face of the optical fiber connector ferrule, and yields few grinding scratches on the end face of the optical fiber.

Specifically, with the polishing member in accordance with the present invention, the end face of the optical fiber connector ferrule can be polished such that no scratch occurs on the polished surface, such that the end of the optical fiber can be formed into a predetermined curved surface shape, and such that no difference in level occurs between the polished surface of the optical fiber (formed from quartz glass, or the like) and the polished surface of the ferrule (formed from zirconia, or the like). As a result, the return loss in optical transfer after the polished end faces are joined to each other can be reduced to at most −50 dB. Also, since no difference in level occurs between the polished surface of the optical fiber and the polished surface of the ferrule, the end face of the optical fiber connector ferrule can be kept free from any dirt.

Further, in the polishing with the polishing member in accordance with the present invention, when necessary, the polishing liquid constituted of water or a silica slurry can be utilized. In cases where the polishing liquid does not contain a base or an acid, waste liquid treatment can be performed easily.

As described above, the thickness of the substrate falls within the range of 25 μm to 150 μm, and the dry thickness of the polishing layer should preferably fall within the range of 5 μm to 15 μm. If the dry thickness of the polishing layer is less than 5 μm, a high durability in the polishing cannot be obtained. For use in practice, it is unnecessary for the polishing layer to have a dry thickness of more than 15 μm. If the thickness of the substrate is less than 25 μm, the substrate will wrinkle and cannot have high suitability for the polishing. If the thickness of the substrate is more than 150 μm, the processing at the time of the application of the coating composition for forming the polishing layer cannot be performed easily, and it will become difficult to flatly attach the polishing member to a support base.

With the process for producing a polishing member in accordance with the present invention, the coating composition for forming the polishing layer is prepared, the coating composition comprising the agglomerated fine silica particles having a mean particle size falling within the range of 0.1μm to 4 μm, the binder, and the organic solvent. The coating composition is applied onto the substrate having a thickness falling within the range of 25 μm to 150 μm. The applied coating composition is then dried to form the polishing layer. By the utilization of, for example, a sand grinder, the dispersing of the agglomerated fine silica particles in the binder can be performed such that they are not dispersed to the level of the primary particles and can be uniformly dispersed with the sizes of the agglomerated particles in the binder. Therefore, the productivity can be enhanced, and the polishing member can be produced at a low cost. Also, as described above, the film strength of the polishing member can be kept high, and the polishing member having good polishing characteristics for the polishing of the end face of the optical fiber connector ferrule can be obtained.

The present invention will hereinbelow be described in further detail with reference to the accompanying drawing.

DETAILED DESCRIPTION OF THE INVENTION

Figure 1:
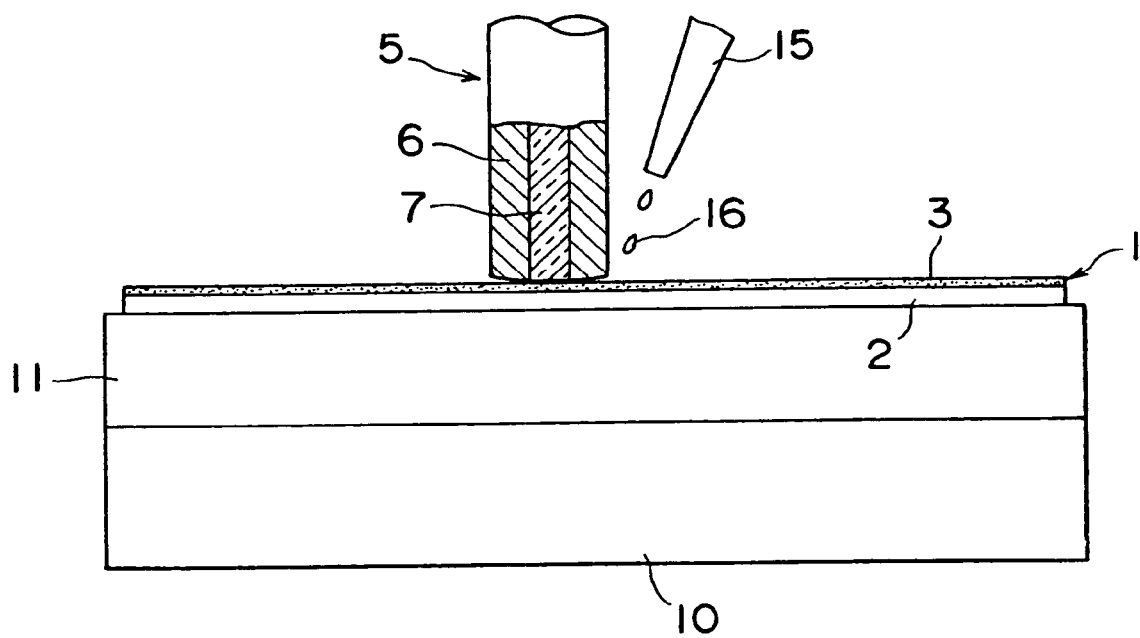
FIG. 1 is a conceptual front view showing how an end face of an optical fiber connector ferrule is polished with an embodiment of the polishing member in accordance with the present invention.

FIG. 1 is a conceptual front view showing how an end face of an optical fiber connector ferrule is polished with an embodiment of the polishing member in accordance with the present invention.

With reference to FIG. 1, a polishing member 1 comprises a substrate 2, which is formed from polyester film, or the like, and which has a thickness falling within the range of 25 μm to 150 μm, and a polishing layer 3, which is overlaid on the substrate 2 and which has a thickness falling within the range of 5 μm to 15 μm. The polishing layer 3 comprises a binder and agglomerated fine silica particles, which act as polishing particles and which are dispersed in the binder. The agglomerated fine silica particles have a mean particle size falling within the range of 0.1 μm to 4 μm. (The agglomerated fine silica particles should preferably have a mean particle size falling within the range of 0.5 μm to 4 μm, and should more preferably have a mean particle size falling within the range of 0.9 μm to 4 μm.) In the polishing layer 3, the binder is contained in a proportion falling within the range of 30 to 100 parts by weight per 100 parts by weight of the agglomerated fine silica particles. The polishing member 1 is formed as, for example, a polishing sheet having a predetermined shape, such as a disk-like shape.

An optical fiber connector ferrule 5 comprises a ferrule 6, which is formed from a ceramic material, such as zirconia, and which has a center hole, and an optical fiber 7, which is formed from a glass material, such as a quartz glass, and which is inserted and secured to the center hole of the ferrule 6. The polishing of the end face of the optical fiber connector ferrule 5 is performed by attaching the polishing member 1 to an elastic member 11, which is located on a support base (a rotating base) 10 and which is formed from rubber, or the like, and pushing the end face of the optical fiber connector ferrule 5 against the polishing member 1 with a predetermined pressure so as to cause the end face of the optical fiber connector ferrule 5 to contact with the polishing member 1. Also, for example, the support base 10 is rotated at a predetermined rotation speed, and the support base 10 or the optical fiber connector ferrule 5 is caused to undergo planetary movement. Further, during the polishing, a polishing liquid (a coolant liquid) 16, which is constituted of water or a slurry (a silica slurry), is supplied from a supply nozzle 15 to the polished part. In this manner, wet polishing is performed. The polishing liquid 16 is utilized to obtain lubrication and cooling effects on the polished part. The polishing liquid 16 does not contain a base or an acid. In cases where the polishing liquid 16 is constituted of the silica slurry, the silica slurry is employed, which contain the silica material identical with the silica material of the agglomerated fine silica particles, which are contained in the polishing layer 3. During the polishing, only either one of the support base 10 and the optical fiber connector ferrule 5 may be moved with respect to the other. Alternatively, both the support base 10 and the optical fiber connector ferrule 5 may be moved with respect to each other. Also, the way in which the support base 10 or the optical fiber connector ferrule 5 is moved, may be altered when necessary.

Though not shown, in the process for producing the polishing member 1, basically, the coating composition for forming the polishing layer is prepared with a coating composition producing apparatus (a sand grinder, or the like) from the agglomerated fine silica particles described above, the binder, a solvent, and the like. With a coating apparatus, the coating composition is applied to a predetermined thickness onto the substrate, which is being moved at a predetermined speed. The applied coating composition is then dried with a drying apparatus to form the polishing layer. Thereafter, calendering is performed (at a linear pressure falling within the range of 50 kg/cm to 300 kg/cm) on the surface of the polishing layer by utilizing a calendering apparatus provided with a metal roll or a resin roll. Further, when necessary, heat treatment is performed with a heat treatment apparatus. Thereafter, punching, slitting, and the like, are performed to form the polishing member having a predetermined shape.

As the fine polishing particles employed in the polishing layer of the polishing member in accordance with the present invention, the agglomerated fine silica particles described above are utilized alone or in combination with other polishing particles. In cases where the agglomerated fine silica particles described above are utilized in combination with other polishing particles, polishing particles having a Mohs hardness falling within the range of 6 to 10 are employed as the other polishing particles. Also, the other polishing particles are employed in a proportion of at most 30% with respect to the total weight of the fine polishing particles. As the other polishing particles, ordinarily, the materials having the polishing effects or scratch polishing effects are utilized. Examples of the materials for the other polishing particles include α-alumina, γ-alumina, α,γ-alumina, fused alumina, silicon carbide, chromium oxide, corundum, artificial diamond, diamond, α-iron oxide, silicon nitride, boron nitride, molybdenum carbide, boron carbide, tungsten carbide, titanium carbide, zirconia, titaniumoxide, ceriumoxide, iron oxide red, and garnet. Principally, one of the above-enumerated materials having a Mohs hardness of at least 7 may be used alone, or two to four materials having a Mohs hardness of at least 7 may be used in combination. As the other polishing particles, the above-enumerated materials having a mean particle size falling within the range of 0.1 μm to 15 μm are utilized. Examples of the polishing particles include AKP1, AKP15, AKP20, AKP30, AKP50, AKP80, Hit50, and Hit100, which are supplied by Sumitomo Chemical Co., Ltd. Such polishing particles are described in, for example, Japanese Patent Publication Nos. 52(1977)-28642 and 49(1974)-39402, Japanese Unexamined Patent Publication No. 63(1988)-98828, U.S. Pat. Nos. 3,687,725, 3,007,807, 3,041,196, 3,293,066, 3,630,010, 3,833,412, and 4,117,190, British Patent No. 1,145,349, and West Germany Patent No. 853,211.

As the binder contained in the polishing layer of the polishing member in accordance with the present invention, any of binders known in the art may be used. Examples of these binders include thermoplastic resins, thermosetting resins, reactive resins, electron beam-curing resins, ultraviolet-curing resins, visible light-curing resins, and mixtures of two or more of these resins.

The thermoplastic resins, which may be used as the binder in the polishing layer of the polishing member in accordance with the present invention, generally have a softening point of 200° C. or lower, an average molecular weight falling within the range of approximately 10,000 to approximately 300,000, and a polymerization degree falling within the range of approximately 50 to approximately 2,000. The polymerization degrees of the thermoplastic resins should preferably fall within the range of approximately 200 to approximately 800. Specifically, as the thermoplastic resin, it is possible to use, for example, a vinyl chloride-vinyl acetate copolymer, a vinyl chloride copolymer, a vinyl chloride-vinyl acetate-vinyl alcohol copolymer, a vinyl chloride-vinyl alcohol copolymer, a vinyl chloride-vinylidene chloride copolymer, a vinyl chloride-acrylonitrile copolymer, an acrylic ester-acrylonitrile copolymer, an acrylic ester-vinylidene chloride copolymer, an acrylic ester-styrene copolymer, a methacrylic ester-acrylonitrile copolymer, a methacrylic ester-vinylidene chloride copolymer, a methacrylic ester-styrene copolymer, a urethane elastomer, a nylon-silicone resin, a nitrocellulose-polyamide resin, polyvinyl fluoride resin, a vinylidene chloride-acrylonitrile copolymer, a butadiene-acrylonitrile copolymer, a polyamide resin, a polyvinyl butyral resin, a cellulose derivative (such as cellulose acetate butyrate, cellulose diacetate, cellulose triacetate, cellulose propionate, nitrocellulose, ethyl cellulose, methyl cellulose, propyl cellulose, methyl ethyl cellulose, carboxymethyl cellulose, or acetyl cellulose), a styrene-butadiene copolymer, a polyester resin, a polycarbonate resin, a chlorovinyl ether-acrylic ester copolymer, an amino resin, a polyamide resin, a synthetic rubber type thermoplastic resin, or a mixture of two or more of the above-enumerated compounds.

Such resins are described in, for example, Japanese Patent Publication Nos. 37(1962)-6877, 39(1964)-12528, 39(1964)-19282, 40(1965)-5349, 40(1965)-20907, 41(1966)-9463, 41(1966)-14059, 41(1966)-16985, 42(1967)-6428, 42(1967)-11621, 43(1968)-4623, 43(1968)-15206, 44(1969)-2889, 44(1969)-17947, 44(1969)-18232, 45(1970)-14020, 45(1970)-14500, 47(1972)-18573, 47(1972)-22063, 47(1972)-22064, 47(1972)-22068, 47(1972)-22069, 47(1972)-22070, and 47(1972)-27886, Japanese Unexamined Patent Publication Nos. 57(1982)-133521, 58(1983)-137133, 58(1983)-166533, 58(1983)-222433, and 59(1984)-58642, and U.S. Pat. Nos. 4,571,364 and 4,752,530.

As the thermosetting resins or the reactive resins, which may be used as the binder in the polishing layer of the polishing member in accordance with the present invention, there should preferably be employed the resins, which have a molecular weight of 200,000 or less when the resins take on the form of coating compositions, and which exhibit an infinite increase in the molecular weight through the condensation reactions, the addition reactions, or the like, when the coating compositions are heated and humidified after being applied onto substrates and dried. Among these resins, the resins, which do not soften or melt before they decompose thermally, should more preferably be employed. Specifically, examples of the thermosetting resins or the reactive resins include a phenol resin, a phenoxy resin, an epoxy resin, a polyurethane resin, a polyester resin, a polyurethane polycarbonate resin, a urea resin, a melamine resin, an alkyd resin, a silicone resin, an acrylic reactive resin (an electron beam-curing resin), an epoxy-polyamide resin, a nitrocellulose melamine resin, a mixture of a high-molecular weight polyester resin with an isocyanate prepolymer, a mixture of a methacrylate copolymer with a diisocyanate prepolymer, a mixture of a polyester polyol with a polyisocyanate, a urea-formaldehyde resin, a mixture of a low-molecular weight glycol, a high-molecular weight diol and a triphenylmethane triisocyanate, a polyamine resin, a polyimine resin, and a mixture of two or more of these compounds.

Such resins are described in, for example, Japanese Patent Publication Nos. 39(1964)-8103, 40(1965)-9779, 41(1966)-7192, 41(1966)-8016, 41(1966)-14275, 42(1967)-18179, 43(1968)-12081, 44(1969)-28023, 45(1970)-14501, 45(1970)-24902, 46(1971)-13103, 47(1972)-22065, 47(1972)-22066, 47(1972)-22067, 47(1972)-22072, 47(1972)-22073, 47(1972)-28045, 47(1972)-28048, and 47(1972)-28922.

In general, the thermoplastic resins, the thermosetting resins, and the reactive resins described above respectively have their major functional groups, and one to six kinds of other functional groups. Each of the other functional groups should preferably be contained in proportions within the range of $1 \times 10^{-6}$ equivalent to $1 \times 10^{-2}$ equivalent per gram of the resin. Examples of the other functional groups include acid groups, such as a carboxylic acid group (COOM), a sulfinic acid group, a sulfenic acid group, a sulfonic acid group ($SO_3M$), a phosphoric acid group [PO(OM)(OM)], a phosphonic acid group, a sulfuric acid group ($OSO_3M$), and ester groups with these acids, wherein M represents H, an alkali metal, an alkaline earth metal, or a hydrocarbon group; groups of amphoteric compounds, such as a group of an amino acid, a group of an aminosulfonic acid, a group of a sulfuric ester of amino-alcohol, a group of a phosphoric ester of amino-alcohol, and an alkyl betaine form group; basic groups, such as an amino group, an imino group, an imido group, and an amido group; a hydroxyl group; an alkoxyl group; a thiol group; an alkylthio group; halogen groups, such as F, Cl, Br, and I; a silyl group; a siloxane group; an epoxy group; an isocyanato group; a cyano group; a nitrile group; an oxo group; an acryl group; and a phosphine group.

In the polishing layer of the polishing member in accordance with the present invention, polyisocyanates may be contained as a curing agent. As the polyisocyanates, it is possible to use, for example, isocyanates, such as tolylene diisocyanate, 4,4'-diphenylmethane diisocyanate, hexamethylene diisocyanate, xylylene diisocyanate, naphthylene-1,5-diisocyanate, o-toluidine diisocyanate, isophorone diisocyanate, and triphenylmethane triisocyanate. As the polyisocyanates, it is also possible to use products of reactions between the above-enumerated isocyanates and polyalcohols, and dimer to decamer polyisocyanates produced from condensation of isocyanates, and products which are obtained from reactions between polyisocyanates and polyurethanes and which have isocyanate groups as terminal functional groups. The polyisocyanates enumerated above should preferably have an average molecular weight falling within the range of 100 to 20,000.

The polyisocyanates enumerated above are commercially available as, for example, Coronate L, Coronate HL, Coronate 2030, Coronate 2031, Myrionate MR, and Myrionate MTL (supplied by Nippon Polyurethane K.K.); Takenate D-102, Takenate D-110N, Takenate D-200, Takenate D-202, Takenate 300S, and Takenate 500 (supplied by Takeda Chemical Industries, Ltd.); Sumidur T-80, Sumidur 44S, Sumidur PF, Sumidur L, Sumidur N, Desmodur L, Desmodur IL, Desmodur N, Desmodur HL, Desmodur T65, Desmodur 15, Desmodur R, Desmodur RF, Desmodur SL, and Desmodur Z4273 (supplied by Sumitomo Bayer K.K.). These polyisocyanates may be used alone, or a mixture of two or more of them may be used by the utilization of differences in curing reaction properties.

Also, in order to promote the curing reaction, compounds having a hydroxyl group (such as butanediol, hexanediol, polyurethane having a molecular weight within the range of 1,000 to 10,000, and water), compounds having an amino group (such as monomethylamine, dimethylamine, and trimethylamine), catalysts, such as metal oxides and iron acetylacetonate, may be used together with the polyisocyanates. The compounds having a hydroxyl group or an amino group should preferably be polyfunctional. The proportions of the polyisocyanate used in each of the polishing layer and the backing layer should preferably fall within the range of 2 to 70 parts by weight per 100 parts by weight of the total of the binder and the polyisocyanate, and should more preferably fall within the range of 5 to 50 parts by weight per 100 parts by weight of the total of the binder and the polyisocyanate. Such polyisocyanates are described in, for example, Japanese Unexamined Patent Publication Nos. 60(1985)-131622 and 61(1986)-74138.

In the polishing layer of the polishing member in accordance with the present invention, compounds having various functions may be added as additives. Examples of the additives include a dispersing agent, a lubricating agent, an antistatic agent, an antioxidant, a mildew-proofing agent, a coloring agent, and a solvent.

Examples of powdered lubricating agents, which may be employed in the polishing layer of the polishing member in accordance with the present invention, include fine particles of inorganic materials, such as graphite, molybdenum disulfide, boron nitride, graphite fluoride, calcium carbonate, barium sulfate, silicon oxide, titanium oxide, zinc oxide, tin oxide, and tungsten disulfide; and fine particles of resins, such as an acryl-styrene resin, a benzoguanamine resin, a melamine resin, a polyolefin resin, a polyester resin, a polyamide resin, a polyimide resin, and a polyfluoroethylene resin.

As the lubricating agents, various organic compounds may also be employed. Examples of such organic compounds include compounds into which fluorine or silicon is introduced, such as a silicone oil (e.g., a dialkyl polysiloxane, a dialkoxy polysiloxane, a phenyl polysiloxane, or a fluoroalkyl polysiloxane, which is supplied as KF96, KF69, or the like, by Shin-Etsu Chemical Co., Ltd.), a fatty acid-modified silicone oil, a fluorine alcohol, a polyolefin (e.g., a polyethylene wax or a polypropylene), a polyglycol (e.g., ethylene glycol or a polyethylene oxide wax), a tetrafluoroethylene oxide wax, a polytetrafluoroglycol, a perfluoroalkyl ether, a perfluorofatty acid, a perfluorofatty acid ester, a perfluoroalkylsulfuric ester, a perfluoroalkylsulfonic ester, a perfluoroalkylbenzenesulfonic ester, and a perfluoroalkylphosphoric ester; organic acids and organic acid ester compounds, such as an alkylsulfuric ester, an alkylsulfonic ester, an alkylphosphonic triester, an alkylphosphonic monoester, an alkylphosphonic diester, an alkylphosphoric ester, and a succinic ester; heterocyclic compounds containing nitrogen or sulfur, such as triazaindolizine, tetraazaindene, benzotriazole, benzotriazine, benzodiazole, and EDTA; a fatty acid ester of a monobasic fatty acid having 10 to 40 carbon atoms with one or at least two of a monohydric alcohol, a dihydric alcohol, a trihydric alcohol, a tetrahydric alcohol and a hexahydric alcohol, each alcohol having 2 to 40 carbon atoms; a fatty acid ester of a monobasic fatty acid having at least 10 carbon atoms with such an monohydric, dihydric, trihydric, tetrahydric, pentahydric or hexahydric alcohol that the sum of the number of the carbon atoms of the fatty acid and the number of the carbon atoms of the alcohol may fall within the range of 11 to 70; and fatty acids, fatty acid amides, fatty acid alkyl amides, and aliphatic alcohols, which have 8 to 40 carbon atoms.

Examples of the above-enumerated organic compound lubricating agents include butyl caprylate, octyl caprylate, ethyl laurate, butyl laurate, octyl laurate, ethyl myristate, octyl myristate, 2-ethylhexyl myristate, ethyl palmitate, butyl palmitate, octyl palmitate, 2-ethylhexyl palmitate, ethyl stearate, butyl stearate, isobutyl stearate, octyl stearate, 2-ethylhexyl stearate, amyl stearate, isoamyl stearate, 2-ethylpentyl stearate, 2-hexyldecyl stearate, isotridecyl stearate, stearic acid amide, stearic acid alkyl amide, butoxyethyl stearate, anhydrosorbitan monostearate, anhydrosorbitan distearate, anhydrosorbitan tristearate, anhydrosorbitan tetrastearate, oleyl oleate, oleyl alcohol, lauryl alcohol, montan wax, and carnauba wax. The above-enumerated compounds may be used alone, or two or more of them may be used in combination.

Further, in the polishing layer of the polishing member in accordance with the present invention, the so-called lubricating oil additives may be used as the lubricating agents. The lubricating oil additives may be used alone, or two or more of them may be used in combination. Examples of such lubricating oil additives include antioxidants known as anticorrosive agents (e.g., metal chelating agents, such as an alkyl phenol, benzotriazine, tetraazaindene, sulfamide, guanidine, nucleic acid, pyridine, amine, hydroquinone, and EDTA), rust preventives (e.g., naphthenic acid, alkenylsuccinic acid, and dilauryl phosphate), oiliness improvers (e.g., colza oil and lauryl alcohol), extreme pressure additives (e.g., dibenzyl sulfide, tricresyl phosphate, and tributyl phosphite), detergent-dispersants, viscosity index improvers, pour point depressants, and foaming preventives. These lubricating agents are added in proportions falling within the range of 0.01 to 30 parts by weight per 100 parts by weight of the binder. Such compounds are described in, for example, Japanese Patent Publication Nos. 43(1968)-23889, 48(1973)-24041, 48(1973)-18482, 44(1969)-18221, 47(1972)-28043, and 57(1982)-56132, Japanese Unexamined Patent Publication Nos. 59(1984)-8136, 59(1984)-8139, and 61(1986)-85621, and U.S. Pat. Nos. 3,423,233, 3,470,021, 3,492,235, 3,497,411, 3,523,086, 3,625,760, 3,630,772, 3,634,253, 3,642,539, 3,687,725, 4,135,031, 4,497,864, and 4,552,794. Examples of the compounds are also described in "IBM Technical Disclosure Bulletin," Vol. 9, No. 7, p. 779 (December 1966); "ELEKTRONIK," 1961, No. 12, p. 380; and "Kagaku Benran" (Chemical Handbook), application edition, pp. 954–967, 1980, Maruzen.

Further, in the polishing layer of the polishing member in accordance with the present invention, as the dispersing agents and dispersion assisting auxiliaries for the polishing particles, it is possible to employ fatty acids having 2 to 40 carbon atoms ($R_1COOH$, wherein $R_1$ represents an alkyl group, a phenyl group, or an aralkyl group, which has 1 to 39 carbon atoms), such as caprylic acid, capric acid, lauric acid, myristic acid, palmitic acid, stearic acid, oleic acid, elaidic acid, linoleic acid, linolenic acid, stearolic acid, behenic acid, maleic acid, and phthalic acid; salts of the above-enumerated fatty acids with alkalimetals (Li, Na, K, and the like), alkaline earth metals (Mg, Ca, Ba, and the like), or ammonia; metallic soaps comprising Cu, Pb, and the like, (e.g., copper oleate); fatty acid amides; and lecithins (e.g., soybean oil lecithin). As the dispersing agents and dispersion assisting auxiliaries, it is also possible to employ higher alcohols having 4 to 40 carbon atoms (e.g., butyl alcohol, octyl alcohol, myristyl alcohol, and stearyl alcohol), sulfuric esters of these higher alcohols, sulfonic acid, phenylsulfonic acids, alkylsulfonic acids, sulfonic esters, phosphoric monoesters, phosphoric diesters, phosphoric triesters, alkylphosphonic acids, phenylphosphonic acids, and amine compounds. As the dispersing agents and dispersion assisting auxiliaries, it is further possible to employ polyethylene glycols, polyethylene oxides, sulfosuccinic acid, sulfosuccinic acid metal salts, and sulfosuccinic esters. Ordinarily, one or more kinds of the dispersing agents are employed. One kind of the dispersing agent is added in proportions falling within the range of 0.005 to 20 parts by weight per 100 parts by weight of the binder. When the dispersing agent is used, it may be adhered to the surfaces of the polishing particles or fine non-polishing particles, or may be added during the dispersion process. Such dispersing agents and dispersion assisting auxiliaries are described in, for example, Japanese Patent Publication Nos. 39(1964)-28369, 44(1969)-17945, 44(1969)-18221, 48(1973)-7441, 48(1973)-15001, 48(1973)-15002, 48(1973)-16363, and 49(1974)-39402, and U.S. Pat. Nos. 3,387,993 and 3,470,021.

Examples of the mildew-proofing agents, which may be employed in the polishing layer of the polishing member in accordance with the present invention, include 2-(4-thiazolyl)-benzimidazole, N-(fluorodichloromethylthio)-phthalimide, 10,10'-oxybisphenoxarsine, 2,4,5,6-tetrachloroisophthalonitrile, p-tolyldiiodomethylsulfone, triiodoallyl alcohol, dihydroacetonic acid, mercury phenyloleate, bis(tributyltin)oxide, and salicylanilide. Such compounds are described in, for example, "Microbial Calamity and Preventing Technique," published by Kogaku Tosho, 1972; and "Chemistry and Industry," Vol. 32, p. 904, 1979.

As the antistatic agents, carbon black, and the like, may be employed in the polishing layer of the polishing member in accordance with the present invention. As the carbon black, furnace black for rubber, thermal black for rubber, coloring black, acetylene black, or the like, may be used.

The specific surface area of the carbon black may fall within the range of 5 m$^2$/g to 500 m$^2$/g. The oil absorption amount, as measured with dibutyl phthalate (DBP), of the carbon black may fall within the range of 10 ml/100 g to 400 ml/100 g. The carbon black should preferably have a pH value falling within the range of 2 to 10, a water content falling within the range of 0.1% to 10%, and a tap density falling within the range of 0.1 g/cm$^2$ to 0.1 g/cm$^2$. Examples of the carbon black include Blackpearls 2000, 1300, 1000, 900, 800, and 700, which are supplied by Cabot Co.; and 650B, 950B, 3250B, 850, 900, 960, 980, 1000, 2300, 2400, and 2600, which are supplied by Mitsubishi Chemical Industries Ltd. The carbon black may be subjected to surface treatment with a dispersing agent, or the like, or may be grafted with a resin.

Examples of the antistatic agents other than carbon black include conductive particles, such as particles of graphite, modified graphite, carbon black graft polymer, tin oxide-antimony oxide, tin oxide, and titanium oxide-tin oxide-antimony oxide; natural surface active agents, such as saponin; nonionic surface active agents, such as an alkyleneoxide compound, a glycerin compound, a glycidol compound, a polyhydric alcohol, a polyhydric alcohol ester, and an adduct of an alkyl phenol with ethylene oxide; cationic surface active agents, such as a higher alkylamine, a cyclic amine, a hydantoin derivative, an amidoamine, an ester amide, a quaternary ammonium salt, a heterocyclic compound, e.g. pyridine, a phosphonium compound, and a sulfonium compound; anionic surface active agents containing acidic groups, such as a carboxylic acid group, a sulfonic acid group, a phosphonic acid group, a phosphoric acid group, a sulfuric ester group, a phosphonic ester group, and a phosphoric ester group; and amphoteric surface active agents, such as an amino acid, an amino sulfonic acid, a sulfate or a phosphate of an amino alcohol, and an alkyl betaine compound.

Several examples of the surface active agents, which may be employed as the antistatic agents, are described in, for example, Japanese Unexamined Patent Publication No. 60(1985)-28025, U.S. Pat. Nos. 2,271,623, 2,240,472, 2,288,226, 2,676,122, 2,676,924, 2,676,975, 2,691,566, 2,727,860, 2,730,498, 2,742,379, 2,739,891, 3,068,101, 3,158,484, 3,201,253, 3,210,191, 3,294,540, 3,415,649, 3,441,413, 3,442,654, 3,475,174, and 3,545,974, West Germany Offenlegungsschrift (OLS) No.1,942,665, and British Patent Nos. 1,077,317 and 1,198,450. Examples of the surface active agents are also described in "Synthesis and Applications of Surface Active Agents" by Ryohei Oda, et al., Tsubaki Shoten, 1972; "Surface Active Agents" by A. W. Bailey, Interscience Publication Incorporated, 1958; "Encyclopedia of Surface Active Agents, Vol. 2" by T. P. Sisley, Chemical Publish Company, 1964; "Surface Active Agent Handbook", sixth edition, Sangyo Tosho K.K., Dec. 20, 1966; and "Antistatic Agents" by Hideo Marushige, Saiwai Shobo, 1968.

The surface active agents may be used alone, or two or more of them may be used in combination. The proportions of the surface active agent in the polishing layer should preferably fall within the range of 0.01 to 10 parts by weight per 100 parts by weight of the polishing particles. In cases where the surface active agent is employed in a backing layer, it may be added in proportions falling within the range of 0.01 to 30 parts by weight per 100 parts by weight of the binder. These surface active agents are used as the antistatic agents. The surface active agents may also be used for purposes other than as the antistatic agents, for example, for dispersion, for improvement of lubricating properties, as coating assisting auxiliaries, as wetting agents, as hardening accelerators, and as dispersion accelerators.

In the polishing member in accordance with the present invention, organic solvents may be used in any proportion during the dispersing, kneading, and coating processes for the polishing particles, the binder, and the like. Examples of such organic solvents include ketones, such as acetone, methyl ethyl ketone, methyl isobutyl ketone, cyclohexanone, and isophorone; alcohols, such as methyl alcohol, ethyl alcohol, propyl alcohol, butyl alcohol, isobutyl alcohol, isopropyl alcohol, and methylcyclohexanol; esters, such as methyl acetate, ethyl acetate, butyl acetate, isobutyl acetate, isopropyl acetate, ethyl lactate, and glycol acetate monoethyl ether; ethers, such as diethyl ether, tetrahydrofuran, ethylene glycol dimethyl ether, ethylene glycol monoethyl ether, and dioxane; aromatic hydrocarbons, such as benzene, toluene, xylene, cresol, chlorobenzene, and styrene; chlorinated hydrocarbons, such as methylene chloride, ethylene chloride, carbon tetrachloride, chloroform, ethylene chlorohydrin, and dichlorobenzene; N,N-dimethylformamide, and hexane. Ordinarily, two or more of the above-enumerated organic solvents are used in combination in arbitrary proportions. The organic solvents may contain small amounts of impurities (e.g., polymerization products of the organic solvents, moisture, and raw material constituents of the organic solvents) in proportions of not larger than 1% by weight.

When the polishing layer is to be formed, the constituents described above are selected appropriately and dispersed or dissolved in the organic solvents, and a coating composition is thereby prepared. The coating composition is applied onto the substrate and dried. Examples of the materials for the substrate include polyesters, such as a polyethylene terephthalate and a polyethylene naphthalate; polyolefins, such as a polypropylene; cellulose derivatives, such as cellulose triacetate and cellulose diacetate; vinyl resins, such as a polyvinyl chloride; plastic materials, such as a polycarbonate, a polyimide, a polyamide, and a polysulfone; metals, such as aluminum and copper; and ceramic materials, such as glass. Before the coating composition is applied onto the substrate, the substrate may be subjected to corona discharge treatment, plasma treatment, prime-coating treatment, heat treatment, dust-resistant treatment, metal vapor evaporation treatment, and/or alkali treatment. The substrates are described in, for example, West Germany Patent No. 3338854A specification, Japanese Unexamined Patent Publication Nos. 59(1984)-116926 and 61(1986)-129731, U.S. Pat. No. 4,388,368, and "Fiber and Industry," by Yukio Mitsuishi, Vol. 31, pp. 50–55, 1975. The surface roughness Ra, expressed in terms of arithmetic mean deviation, of the substrate should preferably fall within the range of 0.001 µm to 0.5 µm (cut-off value: 0.25 mm). In accordance with the characteristics, which the substrate is required to have, the Young's modulus (F5 value) in each of the longitudinal direction and the width direction of the substrate may fall within the range of 100 kg/mm$^2$ to 1,000 kg/mm$^2$ (1 kg/m$^2$=9.8 Pa).

No limitation is imposed on how the dispersing and kneading processes are carried out. The order, in which the constituents (the resins, the particles, the lubricants, the solvents, and the like) are added, the timing, with which the constituents are added during the dispersion and kneading processes, the temperature at which the dispersion process is carried out (and which will ordinarily fall within the range of 0° C. to 80° C.), and the like, may be selected appropriately. In order to prepare the coating composition for the polishing layer, a sand grinder dispersing machine should preferably be employed. However, one of various types of kneading machines may also be used. For example, it is possible to use a twin roll mill, a triple roll mill, a ball mill, a pebble mill, a trommel, a Szegvari attritor, a high-speed impeller dispersing machine, a high-speed stone mill, a high-speed impact mill, a disperser, a kneader, a high-speed mixer, a ribbon blender, a Ko-kneader, an intensive mixer, a tumbler, a blender, a homogenizer, a single-screw extruder, a twin-screw extruder, or an ultrasonic dispersing machine. Ordinarily, a plurality of the dispersing and kneading machines are used, and the dispersing and kneading processes are carried out continuously. Details of the dispersing and kneading techniques are described in, for example, "Paint Flow and Pigment Dispersion," by T. C. Patton, John Wiley & Sons, 1964; "Industrial Materials," by Shin-ichi Tanaka, Vol. 25, p. 37, 1977; and literature cited in these publications. As auxiliary means for the dispersing and kneading techniques, steel balls, steel beads, ceramic beads, glass beads, and organic polymer beads, which have sizes equivalent to sphere diameters of 0.05 mm to 10 cm, may be used in order to carry out the dispersing and kneading processes efficiently. The shapes of these materials are not limited to spheres. These materials are described in, for example, U.S. Pat. Nos. 2,581,414 and 2,855,156. In the present invention, the coating composition for the polishing layer may be prepared by carrying out the dispersing and kneading processes in accordance with the methods described in the aforesaid publications, the literature cited therein, and the like.

When the coating composition for the polishing layer is to be applied onto the substrate, the viscosity of each coating composition may be adjusted at a value falling within the range of 1 to 20,000 centistrokes at 25° C. The coating composition may be applied onto the substrate by using any of coating apparatuses, for example, an air doctor coater, a blade coater, an air-knife coater, a squeeze coater, an impregnation coater, a reverse-roll coater, a transfer roll coater, a gravure coater, a kiss-roll coater, a cast coater, a spray coater, a rod coater, a forward-rotation roll coater, a curtain coater, an extrusion coater, a bar coater, or a lip coater. The other coating methods may also be used. The coating methods are described in, for example, "Coating Engineering," published by Asakura Shoten, pp. 253–277, Mar. 20, 1971. In cases where the polishing layer having a multi-layer constitution is to be employed, simultaneous multi-layer coating, successive multi-layer coating, or the like, may be carried out. Such coating methods are described in, for example, Japanese Unexamined Patent Publication Nos. 57(1982)-123532, 59(1984)-142741, and 59(1984)-165239, and Japanese Patent Publication No. 62(1987)-37451.

With the methods described above, the coating composition for the polishing layer is applied onto the substrate. The applied coating composition is then dried in a plurality of steps at temperatures falling within the range of 20° C. (room temperature) to 130° C., and the formed polishing layer is dried to a thickness falling within the range of 5 μm to 15 μm. Also, calendering is performed in order to adjust the surface roughness and enhance the smoothness of the surface of the polishing layer having been formed in the manner described above. The calendering should preferably be performed such that at least one of calendering rolls is a metal roll, and the metal roll is brought into contact with the surface of the polishing layer and pushed against the surface of the polishing layer. As the calendering rolls, heat-resistant plastic rolls constituted of an epoxy resin, a polyimide resin, a polyamide resin, a polyimide-amide resin, or the like, may be employed. It is also possible to perform the calendering between metal rolls. The calendering temperature should preferably fall within the range of 40° C. to 120° C. The linear pressure should preferably fall within the range of 50 kg/m to 300 kg/m, and the speed should preferably fall within the range of 5 m/min to 500 m/min.

In this case, pre-treatment and surface treatment of particles, kneading and dispersing, coating, drying, smoothing, heat treatment, EB treatment, ultraviolet curing treatment, surface polishing, and winding processes should preferably carried out continuously. Such techniques are described in, for example, Japanese Patent Publication Nos. 39(1964)-28368, 40(1965)-23625, 47 (1972)-38802, 48(1973)-11336, and 52(1977)-17404, Japanese Unexamined Patent Publication Nos. 49( 1974)-53631, 50( 1975)-112005, 51 (1976)-77303, 60(1985)-70532, and 2(1990)-265672, U.S. Pat. Nos. 3,473,960, 4,728,569, and 4,746,542, and British Patent No. 1,191,424. Also, the method described in Japanese Patent Publication No. 41(1966)-13181 is considered as being a basic and important technique in this field.

The thus wound-up polishing member web is formed into pieces of polishing members having a predetermined shape, such as polishing sheets, with punching, slitting, or the like. The polishing member web or the thus formed pieces of polishing members should preferably be subjected to burnishing and/or cleaning. Specifically, with the burnishing, protrusions on the polishing surface are scraped out, and the polishing surface is thereby made smooth by using a hard material, such as a sapphire blade, a shaving blade, a hard material blade, a diamond blade, or a ceramic blade. No limitation is imposed on the hardness of the material used for the burnishing, and any of materials, which can remove protrusions on the polishing surface, may be employed. However, the Mohs hardness of the material used for the burnishing should preferably be 8 or higher. The materials need not necessarily take on the form of blades and may have other shapes, such as square, round, and wheel shapes. (The material may be provided on the circumferential surface of a rotatable cylinder.)

The cleaning of the polishing surface is performed in order to remove foreign substances, excessive lubricating agents, and the like, from the polishing surface. For this purpose, the surface layer of the polishing member is wiped with a nonwoven fabric, or the like. As the wiping materials, it is possible to use, for example, various Vilene products supplied by Japan Vilene Co., Ltd., Toraysee and Ecsaine supplied by Toray Industries, Inc., a material available as Kimwipe (trade name), various polishing members supplied by Fuji Photo Film Co., Ltd., a nylon nonwoven fabric, a polyester nonwoven fabric, a rayon nonwoven fabric, an acrylonitrile nonwoven fabric, a mixed nonwoven fabric, and tissue paper. Such materials are also described in, for example, Japanese Patent Publication Nos. 46(1971)-39309, 58(1983)-46767, and 58(1983)-46768, and Japanese Unexamined Patent Publication Nos. 56(1981)-90429, 63(1988)-259830, and 1(1989)-201824.

As for the polishing particles, the binder, the additives (such as lubricating agents, dispersing agents, antistatic agents, surface treatment agents, carbon black, light blocking agents, antioxidants, and mildew-proofing agents), the solvents, and/or substrates (which may be provided with a prime-coating layer, a backing layer, and a back prime-coating layer), which may be utilized for the polishing member in accordance with the present invention, and how to prepare these constituents, reference may be made to, for example, the production techniques, which is disclosed in Japanese Patent Publication No. 56(1981)-26890, and the like.

EXAMPLES

The present invention will further be illustrated by the following nonlimitative examples. In these examples, the term "parts" means parts by weight.

Examples 1, 2, and 3

A mixture of 100 parts of the polishing particles (fine silica particles) as the constituent of the coating composition for a polishing layer shown later, the binders other than the polyisocyanate and in the amount listed in the coating composition for a polishing layer shown later, and the solvents in the amount listed in the coating composition for a polishing layer shown later were prepared. The mixture was introduced into a sand grinder of 0.25 gallon, and 700 g of glass beads having a diameter of 1.2 mm were added. The sand grinder was rotated at a rotation speed of 1,700 rpm for 150 minutes, and the fine silica particles were thereby dispersed uniformly. Thereafter, the rotation speed of the sand grinder was lowered to 500 rpm, the viscosity of the mixture was adjusted, and the polyisocyanate acting as the curing agent in the amount listed in the coating composition for a polishing layer shown later was added. In this manner, the coating composition for a polishing layer was prepared. The coating composition was applied with a blade coater onto a substrate constituted of polyester (PET) film having a thickness of 75 $\mu$m. The applied coating composition was then dried, and a polishing member web provided with a polishing layer having a dry film thickness of 12 $\mu$m was thereby obtained. The polishing member web was then punched into a disk-like shape, and a sample of a polishing sheet acting as the polishing member was thereby obtained.

In Examples 1, 2, and 3, the polishing particles having different mean particle sizes were employed. In Example 1, agglomerated fine silica particles having a mean particle size of 1.5 $\mu$m were employed as the polishing particles. In Example 2, agglomerated fine silica particles having a mean particle size of 2.5 $\mu$m were employed as the polishing particles. Also, in Example 3, agglomerated fine silica particles having a mean particle size of 4 $\mu$m were employed as the polishing particles.

Each of the polishing members of Examples 1, 2, and 3 was attached to an elastic member located on a support base, and a polishing test for a connector ferrule was performed. In the polishing test, the support base was caused to undergo planetary movement. The speed of rotation round the support base's own axis was 12 rpm, and the speed of the orbital motion was 2 rpm. Twelve connector ferrules were fitted to a jig, the end faces of the connector ferrules were pushed at a load of 20 g/ferrule (total load: 240 g) against the surface of the polishing layer of the polishing member, and the end faces of the connector ferrules were thus brought into contact with the surface of the polishing layer. In this manner, the polishing was performed for 60 seconds. During the polishing, 1 cc of water (or a slurry) was applied dropwise as a polishing liquid onto the polishing layer.

After the polishing test, the presence or absence of flaws on the end faces of the optical fibers fitted in the connector ferrules and the return loss of the optical fiber end faces after being polished were investigated. The results shown Table 1 below were obtained (◯: no flaw was observed, ×: flaws were observed). In Table 1, the dispersibility of the polishing particles in the coating composition for the polishing layer is also shown.

As the return loss (dB), the amount of loss of the transferred light amount due to reflection from the polished surface of the optical fiber was measured. In accordance with the return loss, the surface smoothness, or the like, can be rated. The return loss is represented by −10 log(P1/P2), in which P2 represents the amount of input light, and P1 represents the amount of output light. A dB value, which takes a large value to the minus side, indicates a good transfer state with low reflection and little transfer loss. The dispersibility represents the degree of dispersion of the polishing particles in the coating composition. As for the dispersibility, after the dispersing was performed for a predetermined length of time, a judgment was made as to the coating properties of the coating composition, i.e. whether the coating was possible (◯) or impossible (×).

Comparative Examples 1 to 4

In the same manner as that in Examples 1, 2, and 3, the polishing tests were performed with polishing members obtained in Comparative Examples 1 to 4. The results of the polishing tests are also shown in Table 1. In Comparative Example 1, fine silica particles having a mean particle size of as small as 0.05 $\mu$m were employed. In Comparative Example 2, fine silica particles having a mean particle size of as large as 20 $\mu$m were employed. In Comparative Example 3, polishing particles constituted of alumina (#8000) and having a mean particle size of 1.5 $\mu$m were employed. In Comparative Examples 1, 2, and 3, the coating compositions were the same as those in Examples 1, 2, and 3 except for the polishing particles.

In Comparative Examples 4, colloidal silica particles (having a mean particle size falling within the range of 0.01 $\mu$m to 0.015 $\mu$m) were employed as the polishing particles. The coating composition was prepared from the constituents shown below.

| | |
|---|---|
| Polymer silicone resin (HPC-7502): 30% | 20 parts |
| Colloidal silica: 30% | 80 parts |

The coating composition was subjected to ultrasonic dispersion and applied onto a substrate constituted of polyester (PET) film having a thickness of 75 $\mu$m. The applied coating composition was dried to form a polishing layer having a dry thickness of 3 $\mu$m.

As shown in Table 1, with the polishing members obtained in Examples 1, 2, and 3, good results were obtained with respect to the dispersibility, flaws on the optical fiber surfaces, and the return loss. With the polishing member obtained in Comparative Example 1, wherein non-agglomerated fine silica particles having the small particle size were employed, the dispersibility was bad, a coating composition appropriate for the coating could not be obtained from the dispersing, and good coating properties could not be obtained. With the polishing member obtained in Comparative Example 2, wherein the fine silica particles having the large particle size were employed, flaws occurred on the optical fiber surface after being polished, and the return loss characteristics were bad. With the polishing member obtained in Comparative Example 3, wherein the fine alumina particles were employed as the polishing particles, flaws occurred on the optical fiber surface after being polished, and the return loss characteristics were bad. With the polishing member obtained in Comparative Example 4, wherein the colloidal silica particles were employed as the polishing particles, the dispersibility was good, and no flaw occurred on the optical fiber surface after being polished. However, with the polishing member obtained in Comparative Example 4, the return loss characteristics were worse than with the polishing members of Examples 1, 2, and 3 in accordance with the present invention.

| Coating composition for polishing layer: | |
|---|---|
| Polishing particles (Material: X, mean particle size: Y) | 100 parts |
| Binder (polyester resin, CA118 supplied by Morton Co.) | 10 parts |
| Binder (polyurethane resin containing sulfonic acid group, UR8200 supplied by Toyobo Co., Ltd.) | 30 parts |
| Binder (polyisocyanate, Coronate L supplied by Nippon Polyurethane K.K.) | 20 parts |
| Methyl ethyl ketone (MEK)/anone | 150 parts |
| Butyl acetate | 50 parts |

TABLE 1

| | Polishing particles X | Particle size Y($\mu$m) | Dispersibility | Flaws on fiber surface | Return loss (dB) |
|---|---|---|---|---|---|
| Ex. 1 | Silica | 1.5 | ○ | ○ | −50 |
| Ex. 2 | Silica | 2.5 | ○ | ○ | −50 |
| Ex. 3 | Silica | 4 | ○ | ○ | −49 |
| Comp. Ex. 1 | Silica | 0.05 | × | — | — |
| Comp. Ex. 2 | Silica | 20 | ○ | × | −32 |
| Comp. Ex. 3 | Alumina | 1.5 | ○ | × | −36 |
| Comp. Ex. 4 | Colloidal Silica | 0.01~0.015 | ○ | ○ | −45 |

What is claimed is:

1. A polishing member for use in polishing of an end face of an optical fiber connector ferrule, the polishing member comprising a substrate and a polishing layer, which is overlaid on the substrate and which comprises a binder and fine polishing particles dispersed in the binder, wherein agglomerated fine silica particles having a mean particle size falling within the range of 0.9 $\mu$m to 4 $\mu$m are utilized as the fine polishing particles contained in the polishing layer, and a thickness of the substrate falls within the range of 25 $\mu$m to 150 $\mu$m.

2. A polishing member as defined in claim 1 wherein the polishing with the polishing member is performed while a polishing liquid, which is constituted of water or a silica slurry, is being supplied onto a surface of the polishing layer.

3. A polishing member as defined in claim 1 wherein the polishing liquid is free from a base or an acid.

4. A polishing member as defined in claim 1 wherein a dry thickness of the polishing layer falls within the range of 5 $\mu$m to 15 $\mu$m.

* * * * *